(12) United States Patent
Sweatt (10) Patent No.: US 9,720,996 B1
(45) Date of Patent: Aug. 1, 2017

(54) SYSTEM DEPENDENCIES TRACKING APPLICATION

(71) Applicant: Open Invention Network LLC, Durham, NC (US)

(72) Inventor: James Malcolm Sweatt, Gardendale, AL (US)

(73) Assignee: Open Invention Network LLC, Durham, NC (US)

( * ) Notice: Subject to any disclaimer, the term of this patent is extended or adjusted under 35 U.S.C. 154(b) by 297 days.

(21) Appl. No.: 13/867,741

(22) Filed: Apr. 22, 2013

Related U.S. Application Data (60) Provisional application No. 61/635,925, filed on Apr. 20, 2012.

(51) Int. Cl.
  *G06F 7/00* (2006.01)
  *G06F 17/30* (2006.01)

(52) U.S. Cl.
  CPC .... *G06F 17/30595* (2013.01); *G06F 17/3097* (2013.01); *G06F 17/30557* (2013.01)

(58) Field of Classification Search
  CPC ........... G06F 17/30023; G06F 17/3097; G06F 17/30557; G06F 17/30575; G06F 17/30943; G06F 17/30964; G06F 17/30997; G06F 17/40
  USPC ........................................................ 709/221
  See application file for complete search history.

(56) References Cited

U.S. PATENT DOCUMENTS

| | | | | |
|---|---|---|---|---|
| 5,628,009 A | * | 5/1997 | Kikuta et al. | |
| 5,740,423 A | * | 4/1998 | Logan | G06F 17/30566 |
| 6,018,760 A | * | 1/2000 | Oishi et al. | 709/204 |
| 6,092,083 A | * | 7/2000 | Brodersen | G06F 17/30575 |
| 6,243,747 B1 | * | 6/2001 | Lewis et al. | 709/220 |
| 7,249,118 B2 | * | 7/2007 | Sandler | G06F 17/30333 |
| 7,653,633 B2 | * | 1/2010 | Villella | G06F 11/3476 370/386 |
| 7,713,797 B2 | * | 5/2010 | Lin | G02F 1/133555 257/E21.32 |
| 7,713,979 B2 | * | 5/2010 | Aicher | C07D 207/26 514/254.02 |
| 7,720,813 B2 | * | 5/2010 | Ellsworth | G06F 17/30566 707/634 |
| 7,739,230 B2 | * | 6/2010 | Bourne | G06F 17/301 707/603 |
| 7,860,919 B1 | * | 12/2010 | Patsenker | H04L 41/0803 709/201 |
| 7,949,628 B1 | * | 5/2011 | Blazek | G06F 8/70 707/600 |

(Continued)

OTHER PUBLICATIONS

Johnson et al., "Evolving standards for IT service management". IBM, Systems Journal, vol. 46. No. 3, 2007.*

(Continued)

*Primary Examiner* — Daniel Kuddus (74) *Attorney, Agent, or Firm* — Haynes and Boone, LLP (57) ABSTRACT

A system dependencies tracking application for large scale Information Technology (IT) systems is provided. In one embodiment, a computing system may capture information related to components of an information technology system and relationship information between each component of the information technology system. The computing system may also store the information related to the components and the relationship information in a database.

13 Claims, 5 Drawing Sheets

(56) References Cited

U.S. PATENT DOCUMENTS

| | | | | |
|---|---|---|---|---|
| 7,984,058 B2* | 7/2011 | Seidl | ................ | G06F 17/30392 707/759 |
| 8,032,557 B1* | 10/2011 | Vijendra | ................ | G06Q 10/06 707/783 |
| 8,065,263 B1* | 11/2011 | Blazek | ................ | G06F 8/70 707/600 |
| 8,554,699 B2* | 10/2013 | Ruhl | ................ | G06F 17/3089 706/12 |
| 8,688,708 B2* | 4/2014 | Meadway | ................ | H04L 67/1097 707/740 |
| 8,799,225 B2* | 8/2014 | Vaitzblit | ................ | G06F 21/6227 707/648 |
| 8,954,927 B2* | 2/2015 | Polly | ................ | G06Q 10/10 717/106 |
| 2002/0073080 A1* | 6/2002 | Lipkin | ................ | G06F 17/30867 |
| 2003/0204485 A1* | 10/2003 | Triggs | ................ | H04L 43/0817 |
| 2005/0097149 A1* | 5/2005 | Vaitzblit | ................ | G06F 21/6227 |
| 2006/0117091 A1* | 6/2006 | Justin | ................ | G06F 11/3476 709/217 |
| 2006/0173875 A1* | 8/2006 | Stefaniak | ................ | H04L 67/1008 |
| 2006/0179171 A1* | 8/2006 | Stefaniak | ................ | G06F 9/5061 710/15 |
| 2007/0294406 A1* | 12/2007 | Suer et al. | ................ | 709/226 |
| 2008/0046869 A1* | 2/2008 | Lambert | ................ | G06F 9/4435 717/136 |
| 2008/0126439 A1* | 5/2008 | Kaminsky | ................ | 707/203 |
| 2008/0183724 A1* | 7/2008 | Mueller | ................ | 707/100 |
| 2009/0043825 A1* | 2/2009 | Bourne | ................ | G06F 17/301 |
| 2009/0182767 A1* | 7/2009 | Meadway | ................ | G06F 17/30575 |
| 2009/0300093 A1* | 12/2009 | Griffiths | ................ | G06F 9/5055 709/202 |
| 2010/0106742 A1* | 4/2010 | Guruswamy | ................ | 707/773 |
| 2010/0153377 A1* | 6/2010 | Rajan | ................ | G06F 17/30528 707/723 |
| 2010/0211826 A1* | 8/2010 | Villella | ................ | G06F 11/3476 714/39 |
| 2011/0035512 A1* | 2/2011 | Morimoto | ................ | H04L 41/0856 710/8 |
| 2012/0311157 A1* | 12/2012 | Erickson et al. | ................ | 709/226 |
| 2013/0073573 A1* | 3/2013 | Huang | ................ | G06F 17/30442 707/755 |

OTHER PUBLICATIONS

Sobel et al., "Cloudestone: Multi-Platform, Multil-language Benchmark and Measurement Tools for Web 2.0", Sun Micro System, Oct. 2008.*

* cited by examiner

FIG. 1

Related Art

SYSTEM DEPENDENCIES TRACKING APPLICATION

CROSS-REFERENCE TO RELATED APPLICATION

This application claims the benefit of U.S. Provisional Patent Application No. 61/635,925, filed on Apr. 20, 2012. The subject matter of the earlier filed application is hereby incorporated by reference in its entirety.

FIELD

The present invention relates to tracking applications and, more particularly, to a system dependencies tracking application for large scale systems.

BACKGROUND

Figure 1:
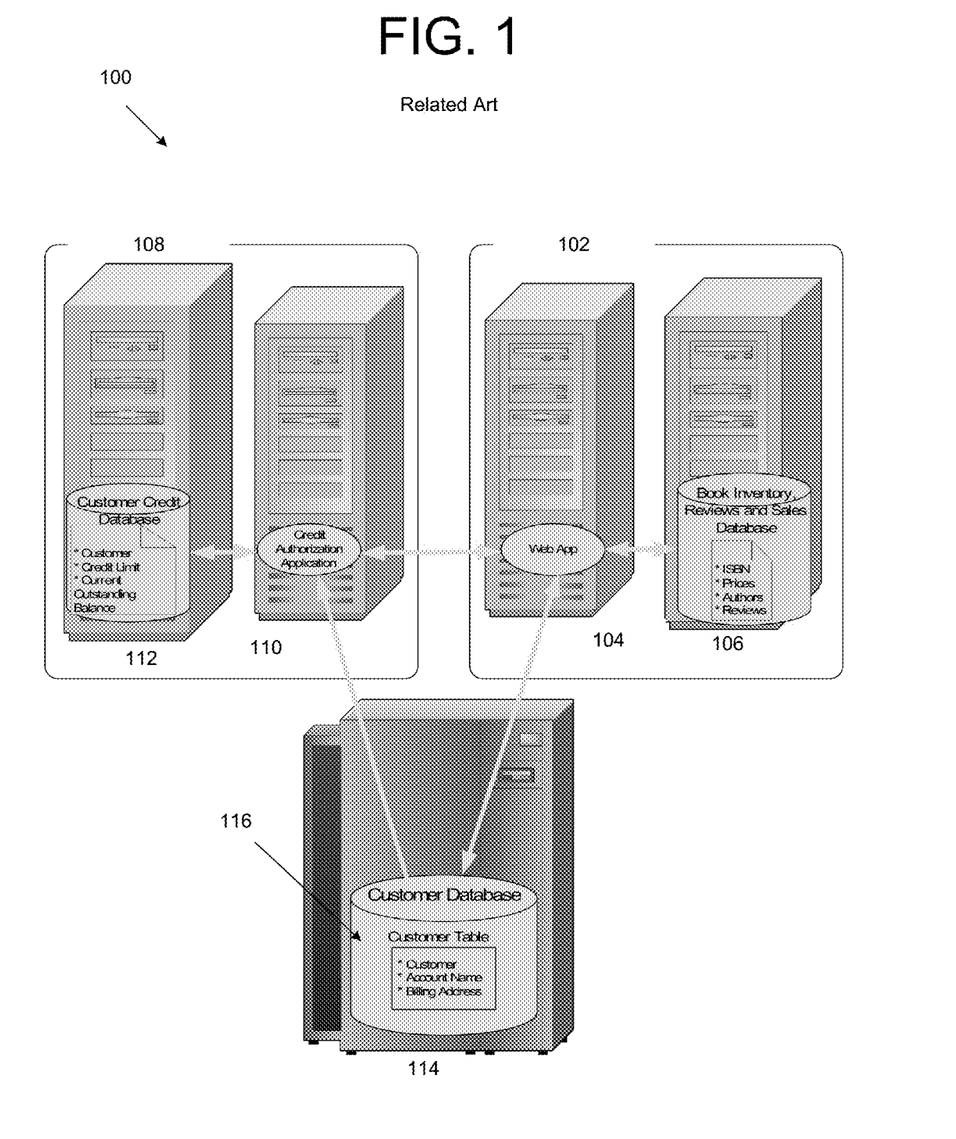
FIG. 1 is a block diagram illustrating a database management system.

A configuration management database (CMDB) is a repository of information related to all components in an information technology (IT) system and the dependencies that exist between system components. FIG. 1, for example, shows related art of conventional system components and data interfaces for a company that sells books online. The company has a point of sale web application 102 and a credit authorization system 108. Point of sales web application 102 includes a data server 106 and an application server 104. Credit authorization system 108 includes a data server 112 and an application server 110. Point of sales web application 102 and credit authorization system 108 connect with shared customer database 116 of data server 114. In addition, web application 102 uses credit authorization system 108 to verify the credit-worthiness of online purchasers.

FIG. 1 shows the types of information that are contained in a CMDB. However, in a typical corporate IT system environment, hundreds of servers, applications, databases, and database objects are highly integrated to perform front, middle, and back-office functions. In such a case, a CMDB would likely be useful for many IT endeavors, including project planning and estimation, systems monitoring and troubleshooting, change management, and others.

However, most CMDB implementations are limited in their usefulness and effectiveness because the repository must be manually maintained. The high frequency of change that occurs in many large-scale IT systems makes it difficult to keep the CMDB up-to-date. Thus, a system dependencies tracking application (e.g., an automated CMDB solution) for large scale IT systems may be beneficial.

SUMMARY

Certain embodiments of the present invention may provide solutions to the problems and needs in the art that have not yet been fully identified, appreciated, or solved by current CMBD systems. For example, the system dependencies tracking application described herein in accordance with some embodiments of the present invention may automatically capture information about IT systems components and the relationships between them. The application may store the component and relationship information in a repository and provide the user with system dependency information in the form of tabular reports and graphical displays.

In one embodiment, an apparatus is provided. The apparatus includes at least one processor and memory storing computer program instructions. The computer program instructions, with the at least one processor, are configured to cause the apparatus to capture information related to components of an information technology system and relationship information between each component of the information technology system. The computer program instructions, with the at least one processor, are further configured to cause the apparatus to store the information related to the components and the relationship information in a database.

In another embodiment, a computer-implemented method is provided. The computer-implemented method includes capturing, by a computing system, information related to components of an information technology system and relationship information between each component of the information technology system. The computer-implemented method further includes storing, by the computing system, the information related to the components and the relationship information in a database.

In yet another embodiment, a computer program is provided. The computer program is embodied on a non-transitory computer-readable medium. The computer program is configured to cause at least one processor to capture information related to components of an information technology system and relationship information between each component of the information technology system. The computer program is further configured to cause the at least one processor to store the information related to the components and the relationship information in a database.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

One or more embodiments described herein pertain to a system dependencies tracking application that may automatically capture information about IT systems components and the relationships between them. The application may store this component and relationship information in a repository and provide the user with system dependency information in the form of tabular reports and graphical displays.

Figure 2:
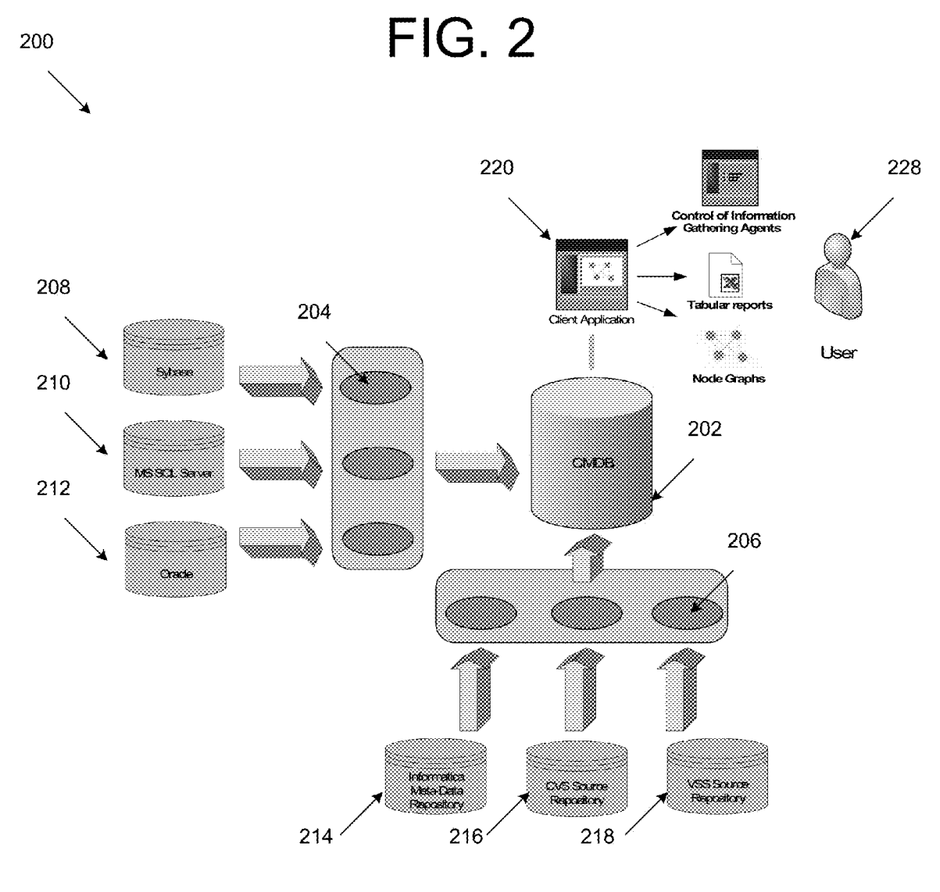
FIG. 2 is a block diagram of a system dependencies tracking application, according to an embodiment of the present invention.

FIG. 2 is a block diagram 200 of a system dependencies tracking application, according to an embodiment of the present invention. Repository-specific data server information gathering agents 204 may be executed by a client application 220 for each target server 208, 210, 212. In one embodiment, repository-specific data server information gathering agents 204 may log into each data server instance and query server meta-data to determine the databases located on that server instance, and store the database name, version, and compatibility level to CMDB 202.

In another embodiment, for each database, repository-specific data server information gathering agents 204 may query the server meta-data to determine all associated database objects, including their type (i.e., table, view, proc, etc.), as well as store database object names and types into CMDB 202. Further, for each database object, repository-specific data server information gathering agents 204 may query server meta-data to determine other database objects referenced by this database object, if any, and store database object dependency information in CMDB 202.

Repository-specific application information gathering agents 206 may be executed by client application 220 on the user's local workstation and perform various functions. For example, repository-specific application information gathering agents 206 may log into each source repository 214, 216, 218, and download the source code for each of the user-specified application components. Repository-specific application information gathering agents 206 may also retrieve a list of databases from CMDB 202, and may scan the application (or Informatica™ job) source code to determine which databases are referenced. Repository-specific application information gathering agents 206 may also retrieve a list of database objects for the referenced databases, as well as search the application (or Informatica™ job) source code for references to one or more database objects. If references are found, repository-specific application information gathering agents 206 may store the dependency information in CMDB 202.

CMDB 202 may store manually entered (mostly) static reference data about the application and data servers, database object types, and data server instance types (i.e. Sybase™, Oracle™, SQL Server™), and application components. CMDB 202 may also include data tables for storing static information about database objects and dependencies between application components and database objects, Informatica™ jobs and database objects, database objects and other database objects, and Informatica™ jobs and non-database objects (such as files).

Client application 220 may provide user 228 with the ability to view and modify the static information contained in CMDB 202. Also, client application 220 allows user 228 to execute (or control) one or more of the repository specific information gathering agents 204, 206. Lastly, client application 220 allows user 228 to view system dependency information in the form of tabular reports and graphical displays.

Figure 3:
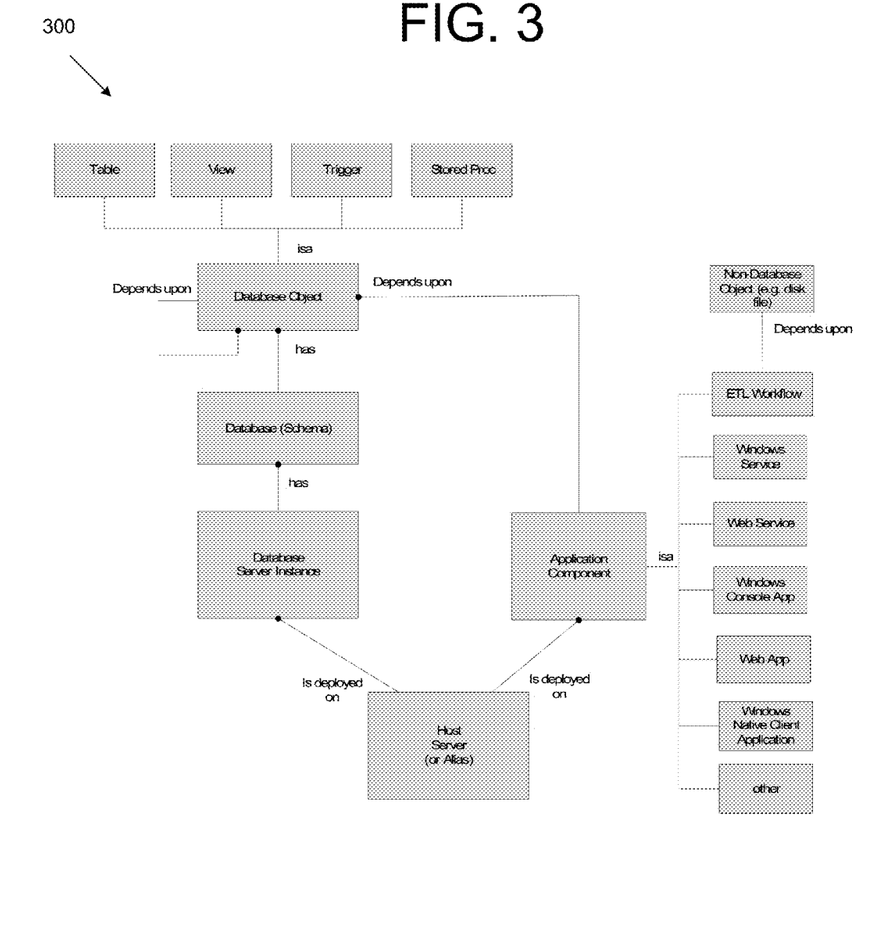
FIG. 3 is a diagram illustrating system component relationships captured by the system dependencies tracking application, according to an embodiment of the present invention.

FIG. 3 is a diagram 300 illustrating system component relationships captured by the system dependencies tracking application, according to an embodiment of the present invention. FIG. 3 is a very high level diagram showing the relational database and application component entities and relationships that will be captured by the system.

Figure 4:
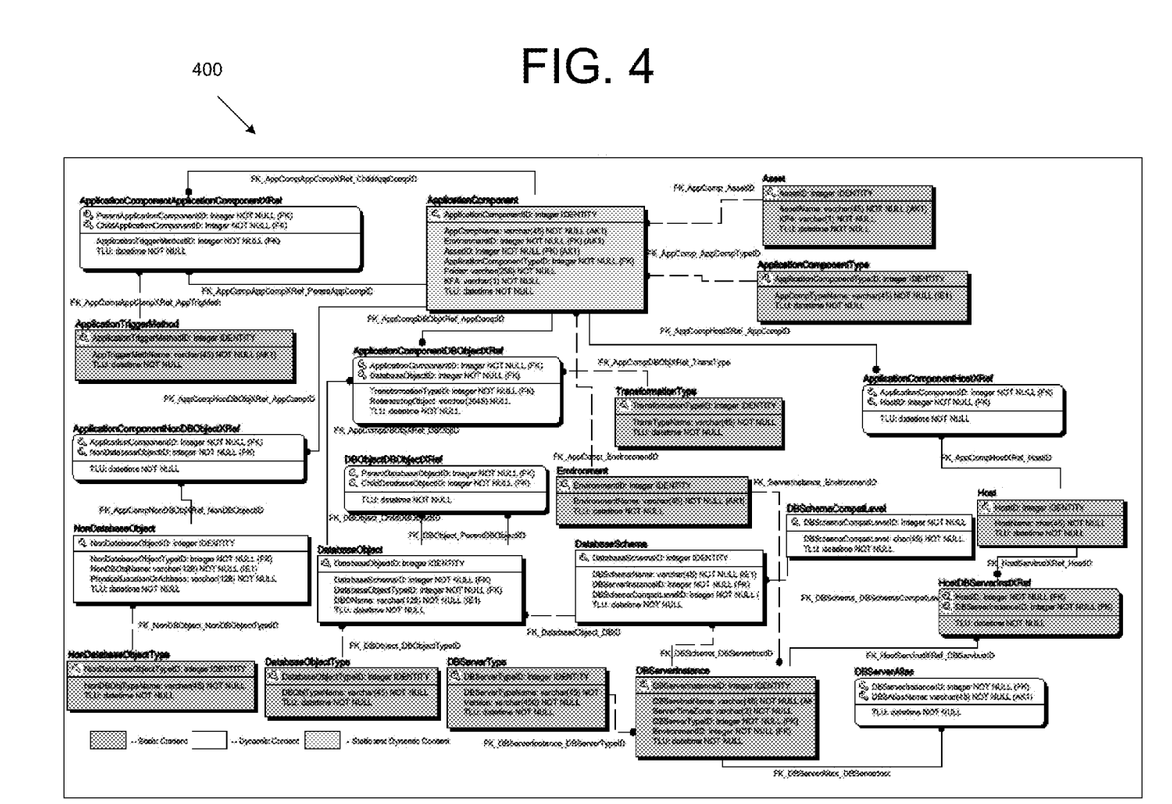
FIG. 4 is a diagram illustrating a physical database design for the system dependencies tracking application, according to an embodiment of the present invention.

FIG. 4 is a diagram 400 illustrating a physical database design for the system dependencies tracking application, according to an embodiment of the present invention. FIG. 4 is a physical database design that shows the relational database tables that will store the information captured by the system with primary and foreign key values. In the diagram, tables with a grey background indicate static reference data. Tables with a white background color are tables that are dynamically populated by the system. Tables light grey background store a combination of static reference data and dynamically populated data.

Figure 5:
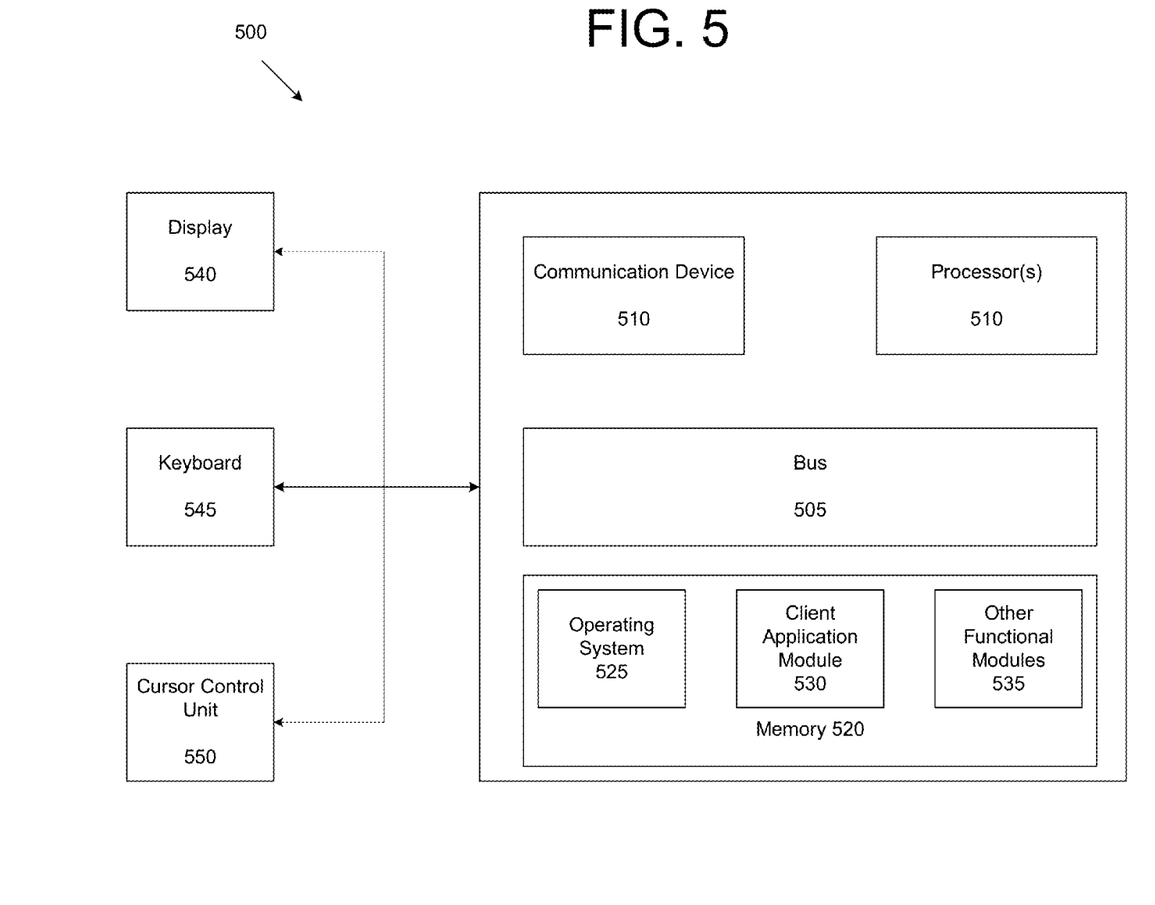
FIG. 5 illustrates a block diagram of a computing system, according to an embodiment of the present invention.

FIG. 5 illustrates a block diagram 500 of a computing system, according to an embodiment of the present invention. Computing system 500 may include a bus 505 or other communication mechanism that can communicate information and at least one processor 510, coupled to bus 505, that can process information. At least one processor 510 can be any type of general or specific purpose processor. Computing system 500 may also include memory 520 that can store information and instructions to be executed by at least one processor 510. Memory 520 can be comprised of any combination of random access memory ("RAM"), read only memory ("ROM"), static storage such as a magnetic or optical disk, or any other type of computer readable medium. Computing system 500 may also include a communication device 515, such as a network interface card, that may provide access to a network.

The computer readable medium may be any available media that can be accessed by at least one processor 510. The computer readable medium may include both volatile and nonvolatile medium, removable and non-removable media, and communication media. The communication media may include computer readable instructions, data structures, program modules, or other data and may include any information delivery media.

Processor 510 can also be coupled via bus 505 to a display 540, such as a Liquid Crystal Display ("LCD"). Display 540 may display information to the user, such as control information, tabular reports, node graphs, etc. A keyboard 545 and a cursor control unit 550, such as a computer mouse, may also be coupled to bus 505 to enable the user to interface with computing system 500.

According to one embodiment, memory 520 may store software modules that may provide functionality when executed by at least one processor 510. The modules can include an operating system 525 and a client application module 530 configured to perform the functions described in FIG. 2. Memory may also include other functional modules 535 as would be readily appreciated by a person of ordinary skill in the art. Operating system 525 may provide operating system functionality for computing system 500. Because computing system 500 may be part of a larger system, computing system 500 may include one or more additional functional modules 535 to include the additional functionality.

One skilled in the art will appreciate that a "system" could be embodied as a personal computer, a server, a console, a personal digital assistant (PDA), a cell phone, a tablet computing device, or any other suitable computing device, or combination of devices. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, offthe-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It should be appreciated that the system dependencies tracking application has several embodiments. For example, in one embodiment, system dependencies tracking application includes data server version support for data server meta-data gathering purposes. In this embodiment, the information gathering agents first detect the version and compatibility mode configuration of each data server and database, and use the detected version and compatibility mode configurations to tailor the meta-data queries. In another embodiment, the application allows the user to maintain static reference data and/or system dependency information manually through the client interface as needed to complement the automatically generated system dependency information collected by the agents.

It will be readily understood that the components of the invention, as generally described and illustrated in the figures herein, may be arranged and designed in a wide variety of different configurations. Thus, the detailed description of the embodiments is not intended to limit the scope of the invention as claimed, but is merely representative of selected embodiments of the invention.

The features, structures, or characteristics of the invention described throughout this specification may be combined in any suitable manner in one or more embodiments. For example, the usage of "certain embodiments," "some embodiments," or other similar language, throughout this specification refers to the fact that a particular feature, structure, or characteristic described in connection with an embodiment may be included in at least one embodiment of the invention. Thus, appearances of the phrases "in certain embodiments," "in some embodiments," "in other embodiments," or other similar language, throughout this specification do not necessarily all refer to the same embodiment or group of embodiments, and the described features, structures, or characteristics may be combined in any suitable manner in one or more embodiments.

One having ordinary skill in the art will readily understand that the invention as discussed above may be practiced with steps in a different order, and/or with hardware elements in configurations that are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. An apparatus, comprising:
   at least one processor; and
   memory comprising computer program instructions, wherein
   the computer program instructions, with the at least one processor, are configured to cause the apparatus to:
      execute at least one data server information gathering agent that logs into at least one data server instance and queries server meta-data on the respective data server instance to determine one or more databases located on that server instance;
      store information pertaining to the one or more databases in a configuration management database;
      execute at least one application information gathering agent that logs into at least one source repository, downloads application source code for one or more user-specified application components from the at least one source repository, scans the application source code to determine one or more databases that are referenced, and stores database dependency information for the application in the configuration management database; and
      store dependency information in a configuration management database when references to one or more database objects are found;
      wherein the at least one data server information gathering agent first detects a version and compatibility mode configuration of the at least one data server instance, and uses the detected version and compatibility mode configuration to tailor the queries of the server meta-data.

2. The apparatus of claim 1, wherein the computer program instructions, with the at least one processor, are further configured to cause the apparatus to query for server meta-data to determine each database object comprising a type of the database object.

3. The apparatus of claim 2, wherein the computer program instructions, with the at least one processor, are further configured to cause the apparatus to query for server meta-data to determine other database objects referenced by the database object.

4. The apparatus of claim 1, wherein the computer program instructions, with the at least one processor, are further configured to cause the apparatus to retrieve a list of each database from a configuration management database and scan application source code to determine which databases are referenced in the list.

5. The apparatus of claim 4, wherein the computer program instructions, with the at least one processor, are further configured to cause the apparatus to retrieve a list of database objects for the referenced databases and search the application source code for references to the one or more database objects.

6. A computer-implemented method, comprising:
- executing at least one data server information gathering agent on a client device that logs into at least one data server instance and queries server meta-data on the respective data server instance to determine one or more databases located on that server instance;
- storing, by a computing system, information pertaining to the one or more databases in a configuration management database;
- execute at least one application information gathering agent that logs into at least one source repository, downloads application source code for one or more user-specified application components from the at least one source repository, scans the application source code to determine one or more databases that are referenced, and stores database dependency information for the application in the configuration management database; and
- storing, by the computing system, dependency information in a configuration management database when references to one or more database objects are found;
- wherein the at least one data server information gathering agent logs into the at least one data server instance and downloads source code for one or more user-specified application components.

7. The computer-implemented method of claim 6, further comprising:
- querying, by the computing system, for server meta-data to determine each database object including a type of the database object.

8. The computer-implemented method of claim 7, further comprising:
- querying, by the computing system, for server meta-data to determine other database objects referenced by the database object.

9. The computer-implemented method of claim 6, further comprising:
- retrieving, by the computing system, a list of each database from a configuration management database and scanning application source code to determine which databases are referenced in the list.

10. The computer-implemented method of claim 9, further comprising:
- retrieving, by the computing system, a list of database objects for the referenced databases; and
- searching the application source code, by the computing system, for references to the one or more database objects.

11. A computer program embodied on a non-transitory computer-readable medium, the computer program configured to cause at least one processor to:
- execute at least one data server information gathering agent that logs into at least one data server instance and queries server meta-data on the respective data server instance to determine one or more databases located on that server instance;
- store information pertaining to the one or more databases in a configuration management database;
- execute at least one application information gathering agent that logs into at least one source repository, downloads application source code for one or more user-specified application components from the at least one source repository, scans the application source code to determine one or more databases that are referenced, and stores database dependency information for the application in the configuration management database; and
- store dependency information in a configuration management database when references to one or more database objects are found;
- wherein the at least one data server information gathering agent logs into the at least one data server instance and downloads source code for one or more user-specified application components.

12. The computer program of claim 11, wherein the computer program is further configured to cause the at least one processor to query for server meta-data to determine each database object including a type of the database object.

13. The computer program of claim 12, wherein the computer program is further configured to cause the at least one processor to query for server meta-data to determine other database objects referenced by the database object.

* * * * *